(12) United States Patent
Starr et al.

(10) Patent No.: US 10,970,833 B2
(45) Date of Patent: Apr. 6, 2021

(54) PIPE IMAGE FEATURE ANALYSIS USING CALIBRATION DATA

(71) Applicant: RedZone Robotics, Inc., Pittsburgh, PA (US)

(72) Inventors: Justin Starr, Baden, PA (US); Galin Konakchiev, Pittsburgh, PA (US); Foster J Salotti, Verona, PA (US); Mark Jordan, Pittsburgh, PA (US); Nate Alford, North Huntington, PA (US); Thorin Tobiassen, Pittsburgh, PA (US); Todd Kueny, Tarentum, PA (US); Jason Mizgorski, Gibsonia, PA (US)

(73) Assignee: RedZone Robotics, Inc., Warrendale, PA (US)

( * ) Notice: Subject to any disclaimer, the term of this patent is extended or adjusted under 35 U.S.C. 154(b) by 69 days.

(21) Appl. No.: 16/184,026

(22) Filed: Nov. 8, 2018

(65) Prior Publication Data
US 2019/0172194 A1 Jun. 6, 2019

Related U.S. Application Data

(60) Provisional application No. 62/583,683, filed on Nov. 9, 2017.

(51) Int. Cl.
*G06T 7/00* (2017.01)
*G06T 7/80* (2017.01)
*G06T 7/62* (2017.01)

(52) U.S. Cl.
CPC .............. *G06T 7/0004* (2013.01); *G06T 7/62* (2017.01); *G06T 7/80* (2017.01); *G06T 2207/10004* (2013.01); *G06T 2207/10016* (2013.01); *G06T 2207/20092* (2013.01);
(Continued)

(58) Field of Classification Search
CPC ........ B25J 9/1617; G06T 7/0004; G06T 7/80; G06T 7/62
See application file for complete search history.

(56) References Cited

U.S. PATENT DOCUMENTS

| 7,993,469 B1 | 8/2011 | Vallapuzha | |
| 2006/0074525 A1* | 4/2006 | Close | B25J 9/1617 700/245 |
| 2010/0218624 A1 | 9/2010 | Atwood | |

(Continued)

OTHER PUBLICATIONS

Valdimirova, International Search Report and The Written Opinion of the International Searching Authority, PCT/US2018/059786, dated Mar. 7, 2019, Federal Institute of Industrial Property, Moscow, Russia (7 pages).

*Primary Examiner* — Myron Wyche
(74) *Attorney, Agent, or Firm* — Cafardi, Ferguson, Wyrick, Weis & Gabriel, LLC; Andrew M. Gabriel

(57) ABSTRACT

One aspect provides a method, including: displaying, at a display screen, an image of an interior of a pipe, the image being obtained using a pipe inspection robot; accessing, using a processor, calibration data associated with the image; receiving, via an input device, user input marking at least a portion of the image; determining, using a processor, quantitative pipe feature data for at least one feature of the pipe using the marking and the calibration data; and providing, based on the determining, data associated with the at least one feature. Other aspects are described and claimed.

20 Claims, 5 Drawing Sheets

(52) U.S. Cl.
CPC ............... *G06T 2207/20104* (2013.01); *G06T 2207/30108* (2013.01); *G06T 2207/30204* (2013.01)

(56) References Cited

U.S. PATENT DOCUMENTS

2014/0293066 A1    10/2014   Cabral et al.
2016/0247017 A1*   8/2016   Sareen ...................... G06T 7/60

* cited by examiner

PIPE IMAGE FEATURE ANALYSIS USING CALIBRATION DATA

CROSS REFERENCE TO RELATED APPLICATIONS

This application claims priority to U.S. Provisional Patent Application Ser. No. 62/583,683, having the same title and filed on Nov. 9, 2017, the contents of which are incorporated by reference in their entirety.

FIELD

The subject matter described herein relates to collection and use of image data of an interior of a pipe to identify and quantify pipe features.

BACKGROUND

Pipes that carry water, other fluids, and gases are an important type of infrastructure. Pipes are often inspected as a matter of routine upkeep or in response to a noticed issue. Various systems and methods exist to gather pipe inspection data. For example, pipe infrastructure data may be obtained by using one or more cameras operatively coupled to a pipe inspection robot that is capable of traversing through a pipe. The one or more cameras are capable of capturing image data (e.g., still images, video, etc.) of visible defects located within a pipe, pipe connections, and the like. The image data may then be viewed by a user (e.g., live as the image data is being captured, at a later time after the image data has been captured, etc.) to determine the type, severity, and location of the defect, pipe connections, pipe features, and the like.

BRIEF SUMMARY

In summary, one aspect provides a method, comprising: displaying, at a display screen, an image of an interior of a pipe, the image being obtained using a pipe inspection robot; accessing, using a processor, calibration data associated with the image; receiving, via an input device, user input marking at least a portion of the image; determining, using a processor, quantitative pipe feature data for at least one feature of the pipe using the marking and the calibration data; and providing, based on the determining, data associated with the at least one feature.

Another aspect provides a system, comprising: an information handling device comprising a display screen, an input device, a processor, and a memory device that stores instructions executable by the processor to: display, at the display screen, an image of an interior of a pipe, the image being obtained using a pipe inspection robot; access calibration data associated with the image; receive, via the input device, user input marking at least a portion of the image; determine quantitative pipe feature data for at least one feature of the pipe using the marking and the calibration data; and provide, based on the determination of the quantitative pipe feature data, data associated with the at least one feature.

A further aspect provides a product, comprising: a non-transitory storage device that stores code executable by a processor, the code comprising: code that displays, at a display screen, an image of an interior of a pipe, the image being obtained using a pipe inspection robot; code that accesses calibration data associated with the image; code that receives user input marking at least a portion of the image; code that determines quantitative pipe feature data for at least one feature associated with the pipe using the marking and the calibration data; and code that provides, based on the determination of the quantitative pipe feature data, data associated with the at least one feature.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
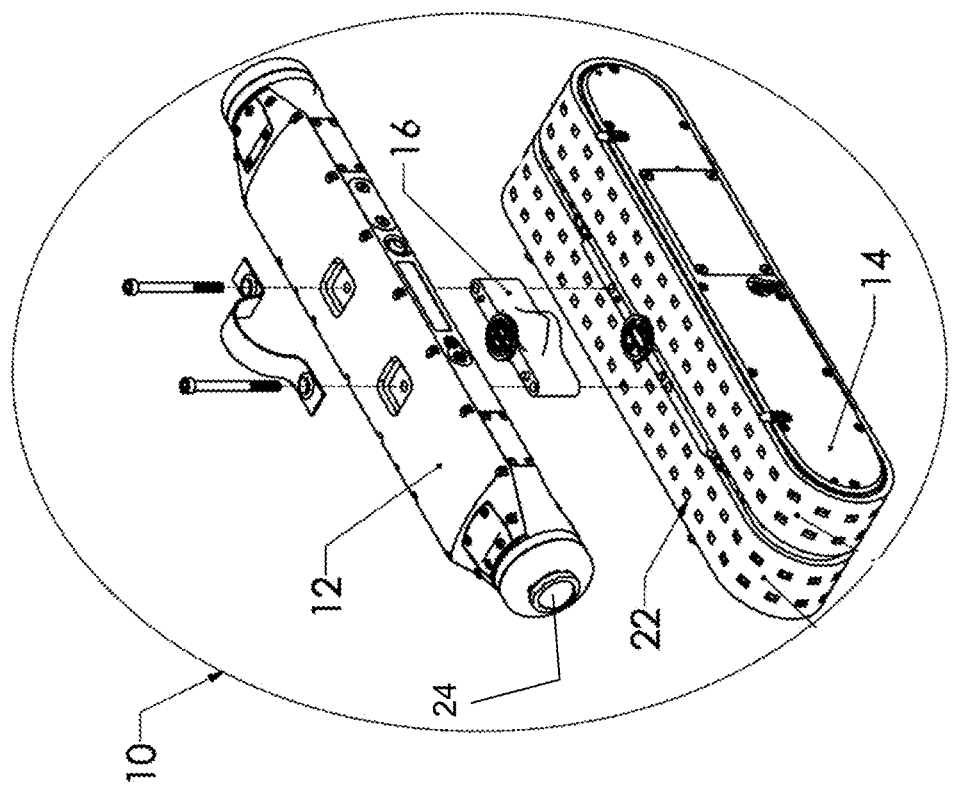
FIG. 1 illustrates an example pipe inspection robot according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, etc. In other instances, well-known structures, materials, or operations are not shown or described in detail to avoid obfuscation.

Image data (e.g., still image data, video data, etc.) captured by one or more image sensors, such as visible light cameras or other image sensors, of a pipe inspection robot may be viewed by a user to identify pipe features such as pipe defects (e.g., cracks, root intrusion, sediment buildup, etc.) located inside of a pipe. In addition to controlling the movement of the pipe inspection robot, users are capable of remotely controlling the cameras (e.g., by utilizing pan and tilt functions, etc.) to look around and attain different visual perspectives of the pipe. The captured image data may be viewed on a display screen by a user located at a remote location.

Conventionally, when observing pipe inspection image data displayed on a screen, users may estimate the size of a potential defect or pipe feature that the user sees in the image data. This is done by an experienced technician, with knowledge of the pipe size, estimating the size of the feature. For example, on a display screen a crack in a pipe may appear over 1 inch of the display screen. However, since the display screen does not typically show the features in their actual size, the user must estimate the actual size of the defect/feature. Accordingly, in this example, one user may estimate the actual size of the crack as 5 inches long, while another user may estimate the actual size of the crack as 4 inches long. Depending on the experience of the users viewing the image data, the estimation may be relatively accurate. Experienced users may have familiarity with particular pipes and their corresponding dimensions, common objects found in those pipes, common defects associated with the pipes, and the like. However, due to the abundance of different pipe types, pipe sizes, potential defects associated with those pipes, and the like, even experienced users may be unable to provide accurate estimations regarding parameters of particular visualized pipe features.

Accordingly, an embodiment provides an accurate and precise method for analyzing captured image data and providing additional information associated with at least one pipe feature in the image data to a user. In an embodiment, image data (e.g., still image data, video data, etc.) associated with a pipe may be received at a display screen. The image data may be obtained by a pipe inspection robot having a calibrated lens. The calibrated lens may be calibrated to accurately identify feature sizes and may allow for easy identification of the real dimensions of displayed pipe features. An embodiment may then receive user input (e.g., touch input, mouse input, etc.) on a portion of the image data and analyze the portion of the image to identify at least one feature (e.g., a defect, an object, etc.) associated with the input. Subsequent to identifying the feature, an embodiment may then provide data, using the characteristics of the calibrated lens, associated with the identified feature (e.g., dimensions of the feature, angle of the feature, identity of the feature, feature type, etc.). Such a method enables users to attain accurate sizing and other characteristic information associated with an identified feature in a pipe.

The description now turns to the figures. The illustrated example embodiments will be best understood by reference to the figures. The following description is intended only by way of example and simply illustrates certain selected example embodiments.

Referring now to FIG. 1, an exploded view of an example pipe inspection robot 10 is illustrated. The device may be utilized to navigate, explore, map, image, etc., various pipe environments (e.g., water pipes, sewer pipes, etc.). By way of example, the pipe inspection robot 10 may be an autonomous or semi-autonomous mobile robot utilized for pipe inspections (e.g., inspection of a municipal wastewater or sewer pipe). However, it will be appreciated that the pipe inspection robot 10 may be embodied in any number of different types of inspection platforms, including non-autonomous devices and tele-operated inspection platforms, and may be utilized in a plurality of other environments.

The pipe inspection robot 10 includes a sensor portion 12 and a chassis portion 14. The sensor portion 12 is electrically and mechanically coupled to the chassis portion 14. The pipe inspection robot 10 may also include a riser portion 16 which is positioned between the sensor portion 12 and the chassis portion 14, and is electrically and mechanically coupled to each. The riser portion 16 operates to increase the distance the sensor portion 12 is situated above the lowest portion of the pipe, and may be utilized in large pipe applications to provide a desired vantage point for various sensing devices of the sensor portion 12. According to other embodiments, the pipe inspection robot 10 does not include the above-described riser portion 16.

Aspects of the pipe inspection robot 10 may be implemented by a computing device and/or a computer program stored on a non-transitory computer-readable medium. The non-transitory computer-readable medium, for example, may comprise a disk or memory device on board the sensor portion 12. The pipe inspection robot 10 may also include distributed parts, e.g., forming part of a distributed system with a logically or physically coupled computer system, for example including a processor, memory, display device and input device (not illustrated in FIG. 1).

According to an embodiment, the sensor portion 12 includes a plurality of sensing devices, e.g., a camera or image sensor 24, a radar device, a sonar device, an infrared device, a laser device, etc., for sensing the conditions within the pipe's interior, e.g., an interior wall of the pipe. The sensor portion 12 may also include a computing device communicably coupled to the sensing devices and having a processor for processing raw information (e.g., raw image data) captured by the sensing devices, a memory device communicably coupled to the computing device for storing the raw and/or processed information, and control circuitry communicably coupled to the computing device for controlling various components of the pipe inspection robot 10, for example circuitry illustrated in FIG. 6. The memory device may also be utilized to store software comprising a program of instructions, which is utilized by the pipe inspection robot 10 to navigate, explore, map, image, etc., the interior of the pipe.

The physical configuration of the pipe inspection robot 10 impacts the quality and type of images obtained by an image sensor 24 included in the sensor portion 12. For example, a pipe inspection robot 10 that includes the riser portion 16 will have its sensor portion 12, and consequently its image sensor 24, positioned differently with respect to the interior pipe wall as compared to a configuration of the pipe inspection robot 10 that does not include the riser portion 16.

Similarly, other differences in the physical makeup of the pipe inspection robot 10 will impact the image quality obtained therewith. For example, the lens of the image sensor 24 included in sensor portion 12 will affect the type of image data obtained. For example, a wide-angle view lens used in camera 24, such as a fisheye lens, will obtain a different image than another type of lens, e.g., a lens that is not a wide-angle lens. Furthermore, even within the same type of lens, the specific physical properties of the lens will affect the quality of the image obtained thereby. For example, lenses of the same type may produce different images, e.g., because of slight imperfections included in the lenses, e.g., due to manufacturing tolerances, or post manufacture effects such scratches or defects introduced into the lens after it has been manufactured. Thus, depending on the type or qualities of the image sensor 24 components, such as the type or condition of the lens used by the image sensor 24, different image qualities and characteristics will be produced by the pipe inspection robot 10.

An embodiment permits users to obtain calibrated image data, for example image data that takes into account the physical configuration of the pipe inspection robot 10. To produce the calibrated image data, e.g., a quantitative measure of a pipe feature, an embodiment employs calibration data. For example, the calibration data comprises information such as the type of pipe inspection robot 10 used to obtain the image data, the type of image sensor 24 used by the sensor portion 12 to capture the image data, the type of lens employed with the image sensor 24, the actual identification of the lens used with the image sensor 24, etc. This permits an embodiment to calibrate the image data to take into account physical properties such that when the image is displayed on a display screen, the actual size of a pipe feature contained within the image, e.g., as highlighted by the user, can be provided as output. This process makes the evaluation of pipe features, such as a crack within a pipe's interior wall, easier and more accurate in that the image data can be processed to automatically obtain the size of the pipe feature, identify the pipe feature, etc.

Figure 2:
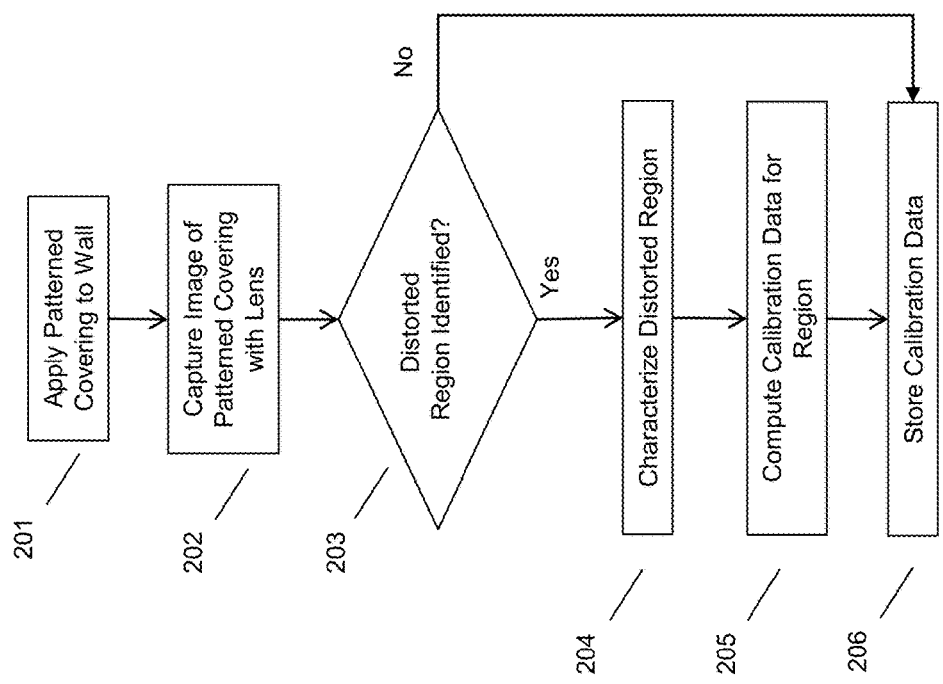
FIG. 2 illustrates an example method of calibrating according to an embodiment.

Referring to FIG. 2, embodiments provide that certain calibration methods may be used to calibrate an image to produce quantitative pipe feature data. For example, a lens may be calibrated to characterize its optical properties, an inspection platform (e.g., pipe inspection robot 10) may be characterized to identify its physical configuration and attributes, a pipe may be characterized in terms of its physical properties (e.g., dimensions, curvature, material construction, etc.) and the like. This information impacts that resultant image produced by an inspection platform such as pipe inspection robot 10, i.e., a different lens, a different physical configuration of the inspection platform, a different type of pipe, etc., will all produce different images of the pipe interior.

By way of example, and referring to FIG. 2, to calibrate a lens a user may cover a wall in graph paper or other material having a regularly defined pattern at 201 and capture an image of the wall with a lens or lens type at 202 to determine characteristics and aberrations of a lens or lens type by inspecting resultant image produced.

For example, an image analysis may be conducted to detect alterations in the expected pattern within the image that are the result of distortions produced by the lens. The distortions produced in the pattern by the lens may be intended, e.g., in the example of certain wide angle type lenses, or may be unintentional, e.g., the result of a defect in the lens. If a distorted region is identified at 203, the distorted region may be characterized at 204. For example, a region within the image may be warped, and the degree of warping within the region may be characterized. This permits the computation of calibration data for the region at 205, e.g., a de-warping effect that is to be applied to this region of the image, a notation that this region of the image is to be excluded or not used in quantitative analysis, etc. The calibration data is then stored at 206 for use in later image processing and production of quantitative pipe feature data.

Other types of lens calibration techniques may be utilized. For example, using a light source or other source behind the lens to cause a projection of the lens onto graph paper or other projection area permits using the projection to make notes and marks of any defects in the lens and associate this information with the lens, for example, by saving it into an accessible database, assigning it to a particular robot, and the like. Additionally, the projection allows a person to make notes regarding the projection distance, depth, and details of how the lens projects onto different objects.

In an embodiment, the extent of calibration may be associated with the quality of the lens type. Lower quality lenses may have more defects (e.g., blemishes, inclusions, other aberrations, etc.) than higher quality lenses. Additionally, in a lens set (e.g., a set of ten lenses, etc.), each of the lenses in the set may have different defects based on the quality of the lenses in the set. Accordingly, lens calibration may be required for each lens in the set. For example, in a set of ten low quality lenses, each of the ten lenses may need to be calibrated because each lens likely has defects particular to that lens. Alternatively, in a set of ten high quality lenses, only one of the ten lenses may need to be calibrated and then that calibration data may be applied to the other nine lenses because the lenses in the high-quality set likely all have substantially the same characteristics.

As described herein, during the calibration process, other information may be obtained for completing the calibration. For example, to accurately calibrate a lens, the distance between the lens and the projection area, the distance between the light source and the lens, the size of the projection, and the like, may be required. This information may be known beforehand, e.g., by storing the physical attributes of the pipe inspection robot 10 configuration, the dimension of the pipe, the location of the pipe inspection robot 10 within the interior of the pipe, and the like. Therefore, an embodiment may use a variety of calibration data, alone or in combination, to provide quantitative pipe feature data.

In an embodiment, image data may be gathered using one or more cameras 24 provided in the sensor portion 12 of the pipe inspection robot 10. In an embodiment, where more than one camera 24 is coupled to the pipe inspection robot 10, one or more of the cameras may contain a calibrated lens. In an embodiment, the image data captured by the camera(s) 24 may be, by way of example and not limitation, still-image data or video image data and may be used to image the inner characteristics and contents of a pipe (e.g., pipe wall features, taps, valves, physical content flowing through the pipe, pipe defects, other content, etc.). In an embodiment, the image data may be displayed to a user at an information handling device (e.g., laptop computer, desktop computer, tablet, smart phone, etc.) that may be in a remote location with respect to the pipe inspection robot 10 (e.g., an office, a laboratory, another location, etc.).

In an embodiment, the image data may be recorded and transmitted to an information handling device (e.g., remote computer) via a wired or wireless connection. The transmission may occur in real time (e.g., immediately or substantially immediately) or may be delayed e.g., image data stored locally on the pipe inspection robot 10, for example if a connection is unable to be established while the pipe inspection robot is in the pipe, etc. In an embodiment, the image data may be recorded and stored remotely (e.g., in the cloud, on another device, in other network storage, on or with a website, etc.) and then accessed from a remote location.

Figure 3:
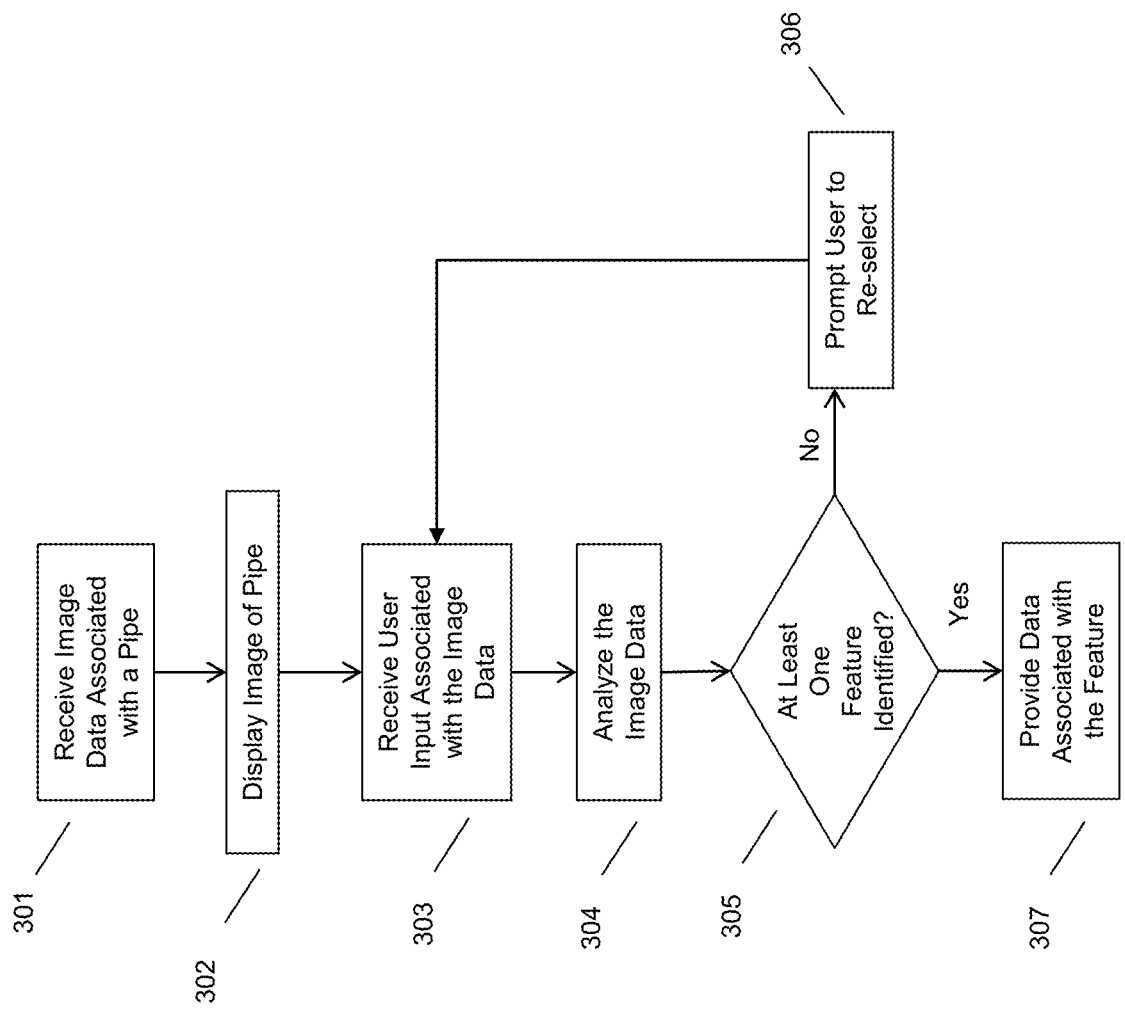
FIG. 3 illustrates an example method of outputting calibrated data for an image according to an embodiment.

After a pipe inspection robot 10 has captured image(s) of the interior of a pipe, a user may utilize the images to obtain quantitative pipe feature data, for example according to the process illustrated in FIG. 3. A pipe inspection robot 10 may provide image data regarding the interior of a pipe at 301. This image data is displayed on a display screen for a user to review, as illustrated at 302. As explained, conventionally an experienced user or technician is required to make an educated guess as to the identity of the feature (e.g., scratch, crack, hole, root intrusion, etc.) and as to the quantitative nature of the feature (e.g., the length of a crack, the size of a hole, the percent area of a blockage, etc.).

In contrast, using calibration data for the image, an embodiment provides an automated pipe feature identification capability, including the ability to produce quantitative pipe feature data. For example, as illustrated at 303, an embodiment receives user input associated with at least a portion of the image that is displayed on the display screen. In an embodiment, the image displayed to a user may be interactive image data. For example, a user may interact with the image by providing user inputs. In an embodiment, user input may be provided using touch input, stylus input, mouse input, and the like. In an embodiment, the user input may comprise a selecting action. The selection action may include highlighting, circling, tracing, underlining, painting or other selection actions that serve to designate a part of the image for further analysis. An embodiment may provide a visual indication (e.g., a colored line, a notification box, a highlighted portion, etc.) on the display screen corresponding to the selection action. For example, a user interested in an object located on the top right portion of the displayed image may draw a circle (e.g., using touch input, etc.) around that object. In another example, a user interested in a displayed crack in the image may trace (e.g., using stylus input, etc.) the length of the crack. In yet a further example, a user interested in a displayed crack in the image may select the crack (e.g., using touch input, etc.) and then may subsequently be presented with a notification box with information regarded the crack, produced by an automated quantitative feature process, as further described herein.

At 304, an embodiment may analyze the portion of the image associated with the user input. In an embodiment, the analysis may be conducted in order to identify the presence of at least one feature. For example, image processing of image pixel data may be conducted to identify the boundaries of an object within the portion of the image selected by the user input. The object may be identified as at least one pipe feature using a variety of image processing techniques. For example, an embodiment may match an object contained within the area selected by the user by matching its characteristics with that of known features. By way of specific example, an embodiment may identify a crack in a pipe wall by analyzing pixels of image data in the area selected by the user in order to identify object boundaries, e.g., using an edge detection mechanism. An embodiment may thereafter match the identified object boundaries with a known object or object set, e.g., a crack may be identified based on detection of an object that is long with a minimal width, and is associated with depth data in the same region (e.g., collected by another sensor of sensor portion 12, e.g., a laser sensor). The identified feature may be any feature associated with a pipe (e.g., cracks in the pipe walls, intersecting taps, valves, physical objects such as roots intruding into the interior of the pipe, sediment buildup, pipe wall decay or erosion, other pipe features, etc.).

The analysis at 304 may include determining quantitative pipe feature data or other information associated with a pipe feature. For example, an embodiment may use the calibration data (e.g., calibrated lens information) to determine quantitative information regarding the selected pipe feature. The quantitative analysis may include using calibration data associated with the calibrated lens, for example, a known defect of the lens distorting an area in the image selected by the user and containing the pipe feature, dimensions of the lens causing warping of the image in a known manner, and/or other information captured during calibration of the lens, and calibration data associated with the pipe and/or pipe inspection robot, e.g., physical dimensions of the pipe, physical configuration or set up of the pipe inspection robot 10, etc. For example, an embodiment may use the size of the pipe (e.g., 5-inch diameter pipe) to translate the image data produced by the camera 24 using the pipe dimensions. Accordingly, an embodiment may use calibration data to account for image characteristics in the image displayed in two dimensions to the user on the display screen. This allows an embodiment to determine that a three-dimensional feature identified by a user, for example by tracing two inches along a displayed image, corresponds in reality to a crack that is five inches long because it traverses a curve in the pipe wall, is warped a certain amount by a wide-angle lens, etc. Thus, an embodiment adjusts the user input data using the calibration data (e.g., lens calibration data, pipe inspection robot calibration data, pipe dimension calibration data, etc.).

The analysis at 304 may include accessing the calibrated lens information and obtaining the pipe parameter information. Obtaining pipe parameter information may be completed using different techniques. One technique may include a user providing input identifying the pipe parameter information. For example, the user may provide information on the size of the pipe, location of the pipe, location of the robot within the pipe, and the like. Another technique may include the pipe inspection robot 10 providing pipe information. For example, the pipe inspection robot 10 may be designed for a particular size pipe. Accordingly, the pipe inspection robot may provide the pipe information to the system. The pipe parameter information may also be provided using different information. For example, based upon the location of the pipe inspection robot 10, the system may compare the geographic information to pipe maps or other known pipe information to determine information about the pipe or other pipe parameters.

If at least one feature in the image data cannot be identified at 305, an embodiment may, at 306, prompt a user to re-select a feature in the image. However, if at least one feature in the image data can be identified at 305, an embodiment may provide data associated with the feature at 307. An embodiment may utilize the calibrated lens data, for example, in conjunction with the pipe information, to provide data (e.g., sizing data, identity data, other data, etc.) for identified pipe features displayed on the display screen. Such a method enables users to obtain more accurate information regarding pipe features they see on a display screen. For example, a 4-inch crack in an 8-inch pipe and an 8-inch crack in a 16-inch pipe may look the same on a display screen. By gathering pipe image data of the 8-inch pipe using a lens calibrated to the dimensional aspects of the 8-inch pipe, an embodiment is able to determine that the displayed crack is 4 inches, not 8 inches, despite the fact that the 4-inch crack and the 8-inch crack occupy the same number of pixels in different images on the display.

Figure 4:
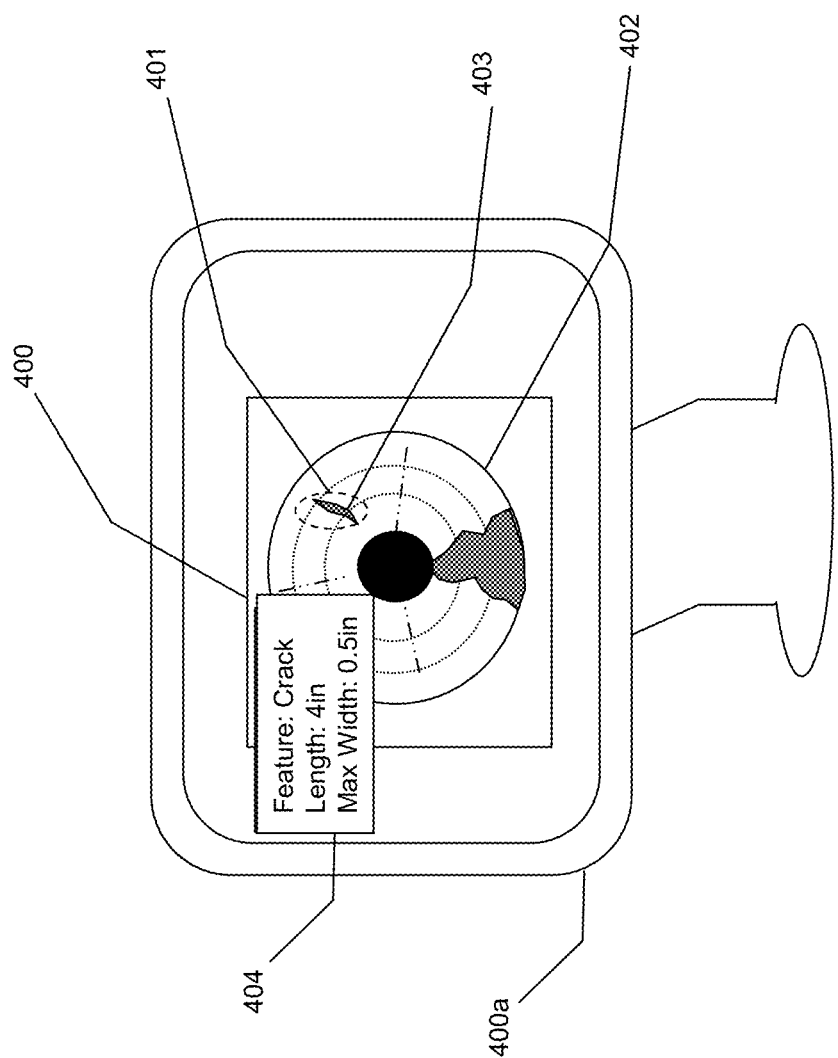
FIG. 4 illustrates an example image markup according to an embodiment.

In an embodiment, the data associated with the pipe feature may comprise size data associated with the pipe feature (e.g., length data, width data, height data, area data, percentage area, other size data, etc.). As illustrated in FIG. 4, for example, in a display screen 400*a* including a touch screen or coupled to another input device, a user may circle a portion 401 of a displayed image 400 of a pipe 402 that includes a pipe feature 403 such as a crack. An embodiment may then analyze the pipe feature 403, e.g., including use of the calibrated lens data or other calibration data for the corresponding image 400, to determine actual size information for the crack 403. An embodiment may then provide the size information to a user as output data 404. In an embodiment, the sizing information may be presented to a user as output (e.g., textual or other visual output, audible output, etc.). For example, an embodiment provides the data 404 "Feature: Crack; Length: 4 in; Max Width: 0.5 in," to a user in a text box co-located somewhere on the displayed image, in a text box co-located on the displayed image near the crack, as text information in another location, audibly, or the like.

In an embodiment, the data 404 associated with the pipe feature may comprise other data. An embodiment may analyze a selected portion of the display for a pipe feature and then provide, based on identified characteristics of the pipe feature (e.g., identified size, diameter, etc.) a best-guess as to what the pipe feature is. For example, a user may circle a portion 401 of a displayed image 400 comprising an unknown pipe feature 403. An embodiment may analyze the image portion 401 to identify characteristics associated with the pipe feature 403 and compare these identified characteristics against stored characteristics associated with known objects (e.g., stored in a database, stored in a lookup table, accessible online, etc.) and/or characteristics associated with objects known to exist in the corresponding pipe. An embodiment may then, based on the comparison, provide a best-guess as to the identity of the pipe feature 403. In an embodiment, the best-guess may be presented to a user as output 404 (e.g., textual output, audible output, etc.). For example, an embodiment may provide the following best-guess identity information, "This feature is likely a crack," to a user using aforementioned output methods.

In an embodiment, size data may be provided in conjunction with the identity data. For example, an embodiment may provide (e.g., using the aforementioned output methods) the following information to a user: "This feature is likely a tap and it measure 8 inches in diameter." An embodiment may identify all detected pipe features in a displayed image 400 and provide data for all of the pipe features, e.g., feature 403, irrespective if the user has provided input to highlight or select the feature. For example, an embodiment may display an image 400 associated with a pipe 402 and then provide (e.g., automatically, responsive to receiving a user indication, etc.) identity and/or sizing information for each pipe feature 403 identified in the displayed image 400.

In an embodiment, data associated with a pipe feature 403 may be provided in real time as the image data is being received. For example, an embodiment may be receiving (e.g., wirelessly, etc.) pipe image data through a live feed. The live feed may be constantly analyzed (e.g., every second, every 5 seconds, at another predetermined interval, etc.) to identify any pipe features captured in the pipe image data. Subsequent to identifying a pipe feature, an embodiment may provide (e.g., using the aforementioned output methods) data regarding that pipe feature to a user, e.g., as indicated at 404.

The various embodiments described herein thus represent a technical improvement to identifying and providing additional information associated with objects and/or features displayed in pipe image data. Using the techniques described herein, an embodiment may use a pipe inspection robot to gather pipe image data through a calibrated lens that is calibrated based on the dimensional aspects of a particular pipe. An embodiment may then analyze a portion of the pipe image data in order to identify a feature of the pipe and then provide data associated with that pipe feature. Such techniques provide a more accurate way of determining the identify and sizing characteristics of various features in a pipe.

Figure 5:
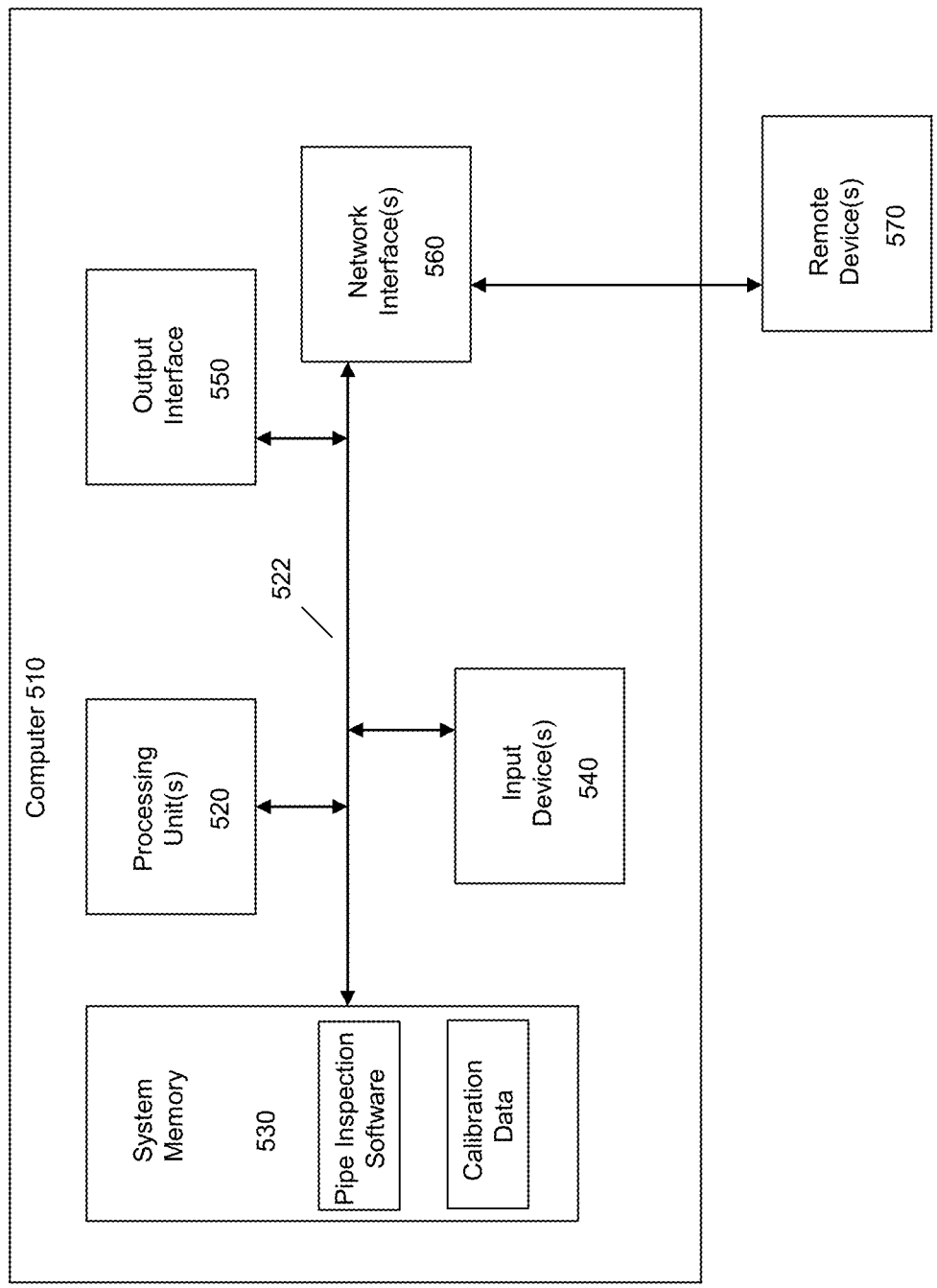
FIG. 5 illustrates an example computing device according to an embodiment.

It will be readily understood that certain embodiments can be implemented using any of a wide variety of devices or combinations of devices. Referring to FIG. 5, an example device that may be used in implementing one or more embodiments includes a computing device (computer) 510, for example included in a pipe inspection robot 10 and/or a computer system providing the display of pipe images in a display screen.

The computer 510 may execute program instructions configured to store and analyze pipe data and perform other functionality of the embodiments, as described herein. Components of computer 510 may include, but are not limited to, a processing unit 520, a system memory 530, and a system bus 522 that couples various system components including the system memory 530 to the processing unit 520. The computer 510 may include or have access to a variety of computer readable media. The system memory 530 may include computer readable storage media in the form of volatile and/or nonvolatile memory devices such as read only memory (ROM) and/or random access memory (RAM). By way of example, and not limitation, system memory 530 may also include an operating system, application programs, other program modules, and program data. For example, system memory 530 may include application programs such as pipe inspection software, e.g., missions, image capture routines, image processing routines, etc. Further, system memory 530 may include calibration data as described herein, that may be predetermined, determined dynamically (e.g., while conducting a pipe inspection mission), or a combination thereof. The calibration data may be transmitted by wired or wireless communication, e.g., from pipe inspection robot 10 to another computing device, independently, as part of the image data, or a combination of the foregoing.

A user can interface with (for example, enter commands and information) the computer 510 through input devices 540 such as a touch screen, a stylus and digitizer pair, a mouse, or a touch pad. A monitor or other type of display screen or device can also be connected to the system bus 522 via an interface, such as interface 550. For example, the display screen 400a of FIG. 4 may be coupled to the computer circuitry via output interface 550. In addition to a monitor, computers may also include other peripheral output devices. The computer 510 may operate in a networked or distributed environment using logical connections to one or more other remote computers or databases. The logical connections may include a network, such local area network (LAN) or a wide area network (WAN), but may also include other networks/buses.

It should be noted that the various functions described herein may be implemented using processor executable instructions stored on a non-transitory storage medium or device. A non-transitory storage device may be, for example, an electronic, electromagnetic, or semiconductor system, apparatus, or device, or any suitable combination of the foregoing. More specific examples of a non-transitory storage medium include the following: a portable computer diskette, a hard disk, a random-access memory (RAM), a read-only memory (ROM), an erasable programmable read-only memory (EPROM or Flash memory), a portable compact disc read-only memory (CD-ROM), or any suitable combination of the foregoing. In the context of this document "non-transitory" includes all media except non-statutory signal media.

Program code embodied on a non-transitory storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    displaying, at a display screen, an image of an interior of a pipe, the image being obtained using a pipe inspection robot and comprising at least one visible feature;
    accessing, using a processor, calibration data associated with the image;
    receiving, via an input device, user input marking at least a portion of the image comprising the at least one visible feature;
    determining, using a processor, quantitative pipe feature data for the at least one visible feature of the pipe using the marking and the calibration data; and
    displaying on the display screen, based on the determining, the quantitative pipe feature data associated with the at least one visible feature in response to the user input.

2. The method of claim 1, wherein the calibration data comprises one or more of data related to a lens and data related to a lens type.

3. The method of claim 1, wherein the calibration data comprises data related to a size of the pipe and a view of the pipe.

4. The method of claim 3, wherein the data related to a view of the pipe comprises a relative viewing angle of the image.

5. The method of claim 1, wherein the calibration data comprises data related to a physical configuration of the pipe inspection robot.

6. The method of claim 1, further comprising automatically identifying the at least one visible feature.

7. The method of claim 1, wherein the quantitative pipe feature data comprises a length or width of the at least one visible feature.

8. The method of claim 1, wherein the quantitative pipe feature data comprises an area of the at least one visible feature.

9. The method of claim 1, wherein the user input comprises one or more of a selection input, a trace input, and a highlight input.

10. The method of claim 1, wherein the providing comprises providing pipe feature size data responsive to the user input.

11. A system, comprising:
    an information handling device comprising a display screen, an input device, a processor, and a memory device that stores instructions executable by the processor to:
    display, at the display screen, an image of an interior of a pipe, the image being obtained using a pipe inspection robot and comprising at least one visible feature;
    access calibration data associated with the image;
    receive, via the input device, user input marking at least a portion of the image comprising the at least one visible feature;
    determine quantitative pipe feature data for the at least one visible feature of the pipe using the marking and the calibration data; and
    display, based on the determination of the quantitative pipe feature data, the quantitative pipe feature data associated with the at least one visible feature in response to the user input.

12. The system of claim 11, wherein the calibration data comprises one or more of data related to a lens and data related to a lens type.

13. The system of claim 11, wherein the calibration data comprises data related to a size of the pipe and a view of the pipe.

14. The system of claim 13, wherein the data related to a view of the pipe comprises a relative viewing angle of the image.

15. The system of claim 11, wherein the calibration data comprises data related to a physical configuration of the pipe inspection robot.

16. The system of claim 11, further comprising automatically identifying the at least one visible feature.

17. The system of claim 11, wherein the quantitative pipe feature data comprises a length or width of the at least one visible feature.

18. The system of claim 11, wherein the quantitative pipe feature data comprises an area of the at least one visible feature.

19. The system of claim 11, wherein the user input comprises one or more of a selection input, a trace input, and a highlight input.

20. A product, comprising:
a non-transitory storage device that stores code executable by a processor, the code comprising:
code that displays, at a display screen, an image of an interior of a pipe, the image being obtained using a pipe inspection robot and comprising at least one visible feature;
code that accesses calibration data associated with the image;
code that receives user input marking at least a portion of the image comprising the at least one visible feature;
code that determines quantitative pipe feature data for the at least one visible feature associated with the pipe using the marking and the calibration data; and
code that displays, based on the determination of the quantitative pipe feature data, the quantitative pipe feature data associated with the at least one visible feature in response to the user input.

* * * * *